May 3, 1960     A. B. HUFFMAN     2,935,281
LICENSE PLATE HOLDER
Filed Feb. 20, 1959
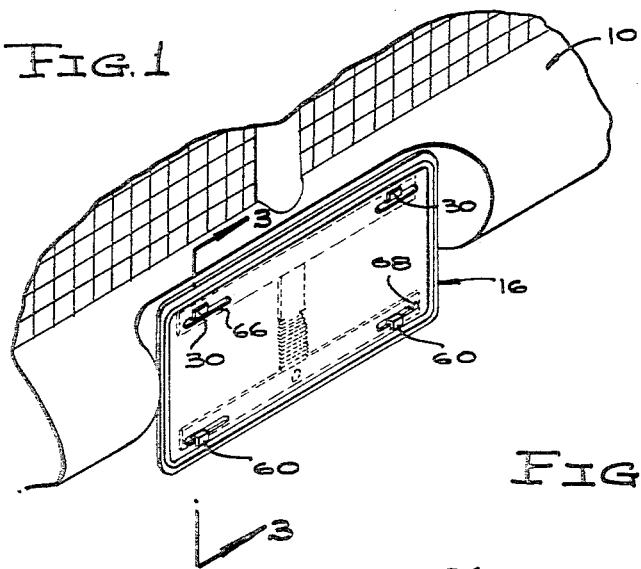
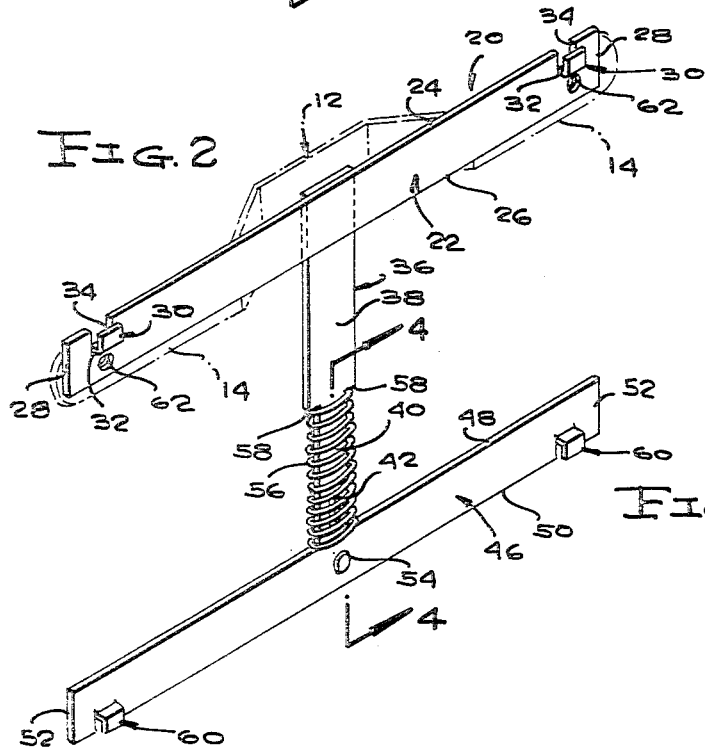
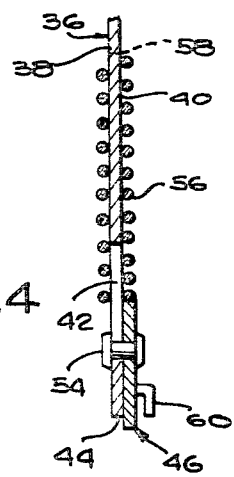
INVENTOR.
ALBERT B. HUFFMAN
BY
McMorrow, Berman & Davidson
ATTORNEYS

United States Patent Office 2,935,281
Patented May 3, 1960

2,935,281

LICENSE PLATE HOLDER

Albert B. Huffman, Dunedin, Fla.

Application February 20, 1959, Serial No. 794,731

4 Claims. (Cl. 248—28)

This invention relates to improvements in holders for license plates, such as automobile license plates, and more particularly to a novel and improved spring tensioned holder of this kind which is adapted to be either formed as a part of or as an accessory to be attached to an existing license plate bracket.

The primary object of the invention is to provide a more practical and efficient holder of the character indicated above which holds a license plate securely, without requiring the use of attaching bolts, and without mutilation of the license plate, and relative to which a license plate can be quickly and easily secured and removed, without the use of tools.

Another object of the invention is to provide a holder of the character indicated above, which is of simple, mechanically superior, and rugged construction, and which, being composed of a small number of simple and easily assembled parts, lends itself to mass production at relatively low cost, as original equipment on automobiles or as an accessory available for purchase by the general public.

Other important objects and advantageous features of the invention will be apparent from the following description and the accompanying drawings, wherein, for purposes of illustration only, a specific form of the invention is set forth in detail.

In the drawings:

Figure 1 is a fragmentary perspective view showing a license plate mounted on an automobile bumper bar by means of a holder of the present invention;

Figure 2 is an enlarged perspective view of said holder, per se, and of an associated automobile license plate bracket to which the holder can be attached;

Figure 3 is an enlarged fragmentary vertical section taken on the line 3—3 of Figure 1; and Figure 4 is an enlarged fragmentary vertical section taken on the line 4—4 of Figure 2.

Referring in detail to the drawings, wherein like numerals designate like parts throughout the several views, there is shown a support, such as an automobile bumper bar 10, having thereon a license plate bracket 12 having outstanding arms 14 to which a license plate 16 is usually secured by means of bolts 18. In accordance with the present invention, a holder, generally designated 20 is to be attached by the bolts 18 to the bracket arms 14 or to any other suitable support, and to grip and hold a license plate 16 as hereinafter described, instead of having the license plate mounted or the desired support by means of the bracket 12 or any other means.

The holder 20 comprises a relatively stationary upper horizontal bar 22, preferably of flat bar stock, and having preferably parallel upper and lower edges 24 and 26, respectively, and ends 28. Formed on and preferably struck out of the upper edge 24 at points close to but spaced from the ends 28 of the upper bar 22, are laterally extending L-shaped hooks 30 having horizontal portions 32, and vertical portions 34 which are spaced from the outer side of the bar 22, the horizontal portions 32 being spaced below the upper edge 24. The vertical portions 34 can, as shown in Figure 3, be spaced from the bar 22 at a distance greater than the thickness of the license plate 16, or at a lesser distance, so that, in effect, the license plate is gripped between the vertical hook portions 34 and the outer side of the bar 22 when the license plate is assembled to the holder 20.

Fixed in a suitable rigid manner at its upper end to the inner side of the upper bar 22, at the center thereof, is a single depending vertical bar 36, which is preferably of flat bar stock, and which has a full width upper portion 38 and a reduced width lower portion 40 which is formed with a central closed vertical slot 42 which is located near to and is spaced from the lower end 44 of the vertical bar 36.

The holder 20 further comprises a movable lower horizontal bar 46, generally similar to but reversed with respect to the upper horizontal bar 22, having upper and lower edges 48 and 50, respectively, and ends 52. The reduced width lower portion 40 of the vertical bar 36 is slidably engaged with the back or inner side of the lower bar 46 at the middle of the latter, and a headed rivet 54, secured through the lower bar 46, extends through the slot 42, whereby the lower bar 46 is secured to and is mounted on the vertical bar 36 to pivot freely and slide vertically relative thereto and to the upper bar 22.

Biasing the lower bar 46 downwardly and away from the upper bar 22, and serving to urge the lower bar 46 to right angular relationship to the vertical bar 36 and to parallelism with the upper bar 22, is a preferably flat helical expanding spring 56. The spring 56 is circumposed on the reduced width lower portion 40 of the vertical bar 36, and is compressed between shoulders 58 defined at the lower end of the full width portion 38 of the vertical bar 36, and the upper edge 48 of the lower bar 46. Formed on a struck out of the lower edge 50 of the lower bar 46 are L-shaped hooks 60 which are the same in form and arrangement as, but are reversed with respect to, the upper bar hooks 30.

The upper bar 22 is provided with bolt holes 62, preferably beneath the hooks 30, to pass the bolts 18 which are used to attach the holder 20 to existent bracket arms 14, or to any other desired support, so that the heads of these bolts are out of the way beneath the hooks 30 and are concealed by the license plate 16.

As is apparent from Figures 1 and 3, wherein an existent license plate bracket 12 is shown as being mounted on the supporting bumper bar 10 by means of bolts 64, the holder 20 is first attached to the support by means of the bolts 18 through only its upper bar 22, so that the lower bar 46 is free to slide and pivot on the vertical bar 36 and to be positioned by the spring 56. The license plate 16 has near its ends upper slots 66 and lower slots 68. For easy mounting of the license plate on the holder 20, the upper slots 66 are first engaged over the upper hooks 30, and then the lower bar 46 is pushed upwardly with the fingers of one hand, against the resistance of the spring 56, and the license plate is manipulated with the other hand, so that the lower hooks 60 become engaged through the lower license plate slots 68, whereat the spring 56 expands so as to clamp the license plate securely to the holder between the horizontal portions of the upper and lower hooks thereof. To remove the license plate from the holder, the lower bar 46 is pushed upwardly with the fingers and the license plate manipulated so that the lower hooks become disengaged from the lower slots 68, whereupon the license plate is simply lifted off the upper hooks 30.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A license plate holder comprising an upper relatively stationary horizontal bar, a vertical bar fixed to and depending from said upper bar, a lower movable bar, means pivotally and slidably securing said lower bar to said vertical bar in spaced relation below said upper bar, upper license plate engaging means on said upper bar, lower license plate engaging means on said lower bar, and spring means acting between said vertical bar and said lower bar and biasing said lower bar downwardly away from said upper bar.

2. A license plate holder comprising an upper relatively stationary horizontal bar, a vertical bar fixed to and depending from said upper bar, a lower movable bar, means pivotally and slidably securing said lower bar to said vertical bar in spaced relation below said upper bar, upper license plate engaging means on said upper bar, lower license plate engaging means on said lower bar, and spring means acting between said vertical bar and said lower bar and biasing said lower bar downwardly away from said upper bar, said upper means having upwardly directed license plate slot entering hooks and said lower means having downwardly directed license plate slot entering hooks.

3. A license plate holder comprising an upper relatively stationary horizontal bar, a vertical bar fixed to and depending from said upper bar, a lower movable bar, means pivotally and slidably securing said lower bar to said vertical bar in spaced relation below said upper bar, upper license plate engaging means on said upper bar, lower license plate engaging means on said lower bar, and spring means acting between said vertical bar and said lower bar and biasing said lower bar downwardly away from said upper bar, said upper means having upwardly directed license plate slot entering hooks and said lower means having downwardly directed license plate slot entering hooks, said vertical bar having a lower portion, shoulder means on said vertical bar above said lower portion, said securing means comprising a vertical slot in said lower portion, and a rivet fixed on said lower bar and extending through said slot.

4. A license plate holder comprising an upper relatively stationary horizontal bar, a vertical bar fixed to and depending from said upper bar, a lower movable bar, means pivotally and slidably securing said lower bar to said vertical bar in spaced relation below said upper bar, upper license plate engaging means on said upper bar, lower license plate engaging means on said lower bar, and spring means acting between said vertical bar and said lower bar and biasing said lower bar downwardly away from said upper bar, said upper means having upwardly directed license plate slot entering hooks and said lower means having downwardly directed license plate slot entering hooks, said vertical bar having a lower portion, shoulder means on said vertical bar above said lower portion, said securing means comprising a vertical slot in said lower portion, and a rivet fixed on said lower bar and extending through said slot, said spring means having a helical spring circumposed on the lower portion of the vertical bar and compressed between said shoulder means and said lower bar.

References Cited in the file of this patent

UNITED STATES PATENTS

| | | |
|---|---|---|
| 1,784,196 | Naggatz | Dec. 9, 1930 |
| 2,162,634 | Paine | June 13, 1939 |
| 2,266,715 | Parrott | Dec. 16, 1941 |